April 22, 1969 R. A. PEARSON 3,439,404
TAG ATTACHING APPARATUS

Filed Aug. 2, 1966 Sheet 1 of 6

Fig. 1

INVENTOR.
REINHOLD A. PEARSON
BY
ATTYS.

United States Patent Office 3,439,404
Patented Apr. 22, 1969

3,439,404
TAG ATTACHING APPARATUS
Reinhold A. Pearson, E. 304 2nd Ave.,
Spokane, Wash. 99202
Filed Aug. 2, 1966, Ser. No. 569,647
Int. Cl. B23p 19/04
U.S. Cl. 29—208    9 Claims

ABSTRACT OF THE DISCLOSURE

An apparatus for attaching a tag about the neck of a bottle. Tags in the form of a sheet are stored within a hopper above the individual bottles. A suction cup movably adheres to each tag and positions the tag upwardly adjacent to the bottle neck. A tubular member is then forced downwardly over the bottle to cause the tag to encircle the bottle neck.

---

This invention relates to an apparatus for attaching onto the necks of individual bottles a tag having a slotted section adapted to yieldably grip the bottle exterior. Such tags may be used for advertising and other promotional purposes in the sale of bottled beverages and food products.

The present apparatus is not limited to any particular industry. However, the tags applied by the apparatus are used by the beverage industries in the distribution of soft drinks in bottled containers. Such drinks are marketed in "six packs," being cartons of six bottles for consumer carrying. It is today a common practice in many areas to place on a single botle of each "six pack" a rectangular tag that is slotted or otherwise apertured to fit over and grip the exterior of the bottle opening. Written upon this tag are sales slogans and price information, particularly relating to reduced or discount price offerings. At present such tags are placed on the bottle by hand.

The present invention provides an automatic apparatus for placing such tags on selected bottles in the cartons in which they will be sold. It provides a highly adaptable apparatus which can be easily adjusted to fit different sizes of cartons and different sizes of bottles. It provides accurate placement of each tag on a selected bottle in each carton assembly. It virtually eliminates the manual labor involved today in handling and attaching the tags.

It is a first object of this invention to provide a relatively simple apparatus for indexing bottles in cartons and placing upon a selected bottle or bottles in each carton a promotional tag adapted to yieldably fit over the exterior bottle opening.

Another object of this invention is to provide a highly adaptable apparatus which can be used for placing tags on any common size and type of bottle and which can be used in conjunction with any conventional carton arrangement of the bottles.

Another object of this invention is to provide an apparatus capable of placing the tags on bottles in conjunction with conventional high speed bottling equipment. The steps of placing the tag on the individual bottles are sufficient and simple, and involve only momentary stoppage of the bottles themselves.

Another object of this invention is to provide an apparatus for effectively placing the tags on a bottle by an apparatus which will hold each tag until it is positively fitted on the bottle, assuring that each bottle is properly tagged. Furthermore, the attachment of the tag does not involve direct handling of a bottle or direct engagement of the bottle with any moving elements, minimizing the possibility of bottle breakage or damage due to tag placement.

These and further objects will be evident from the following disclosure, taken together with the accompanying drawings which illustrate a preferred form of the invention. It is to be understood that this form of the invention is only by way of example and that various modifications could be made by one skilled in the art without deviating from the scope of the disclosure.

Figure 1:
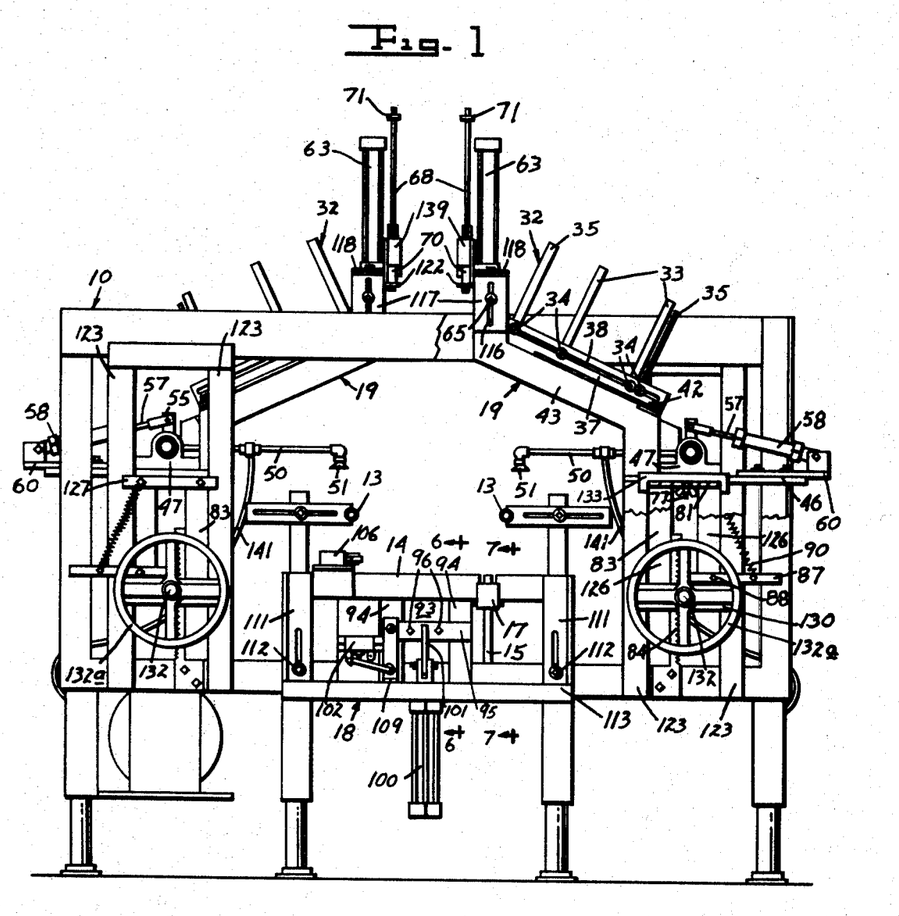
FIGURE 1 is a front elevation view of the apparatus with part of the apparatus being broken away to show the mounting of a tag attaching unit.
Figure 2:
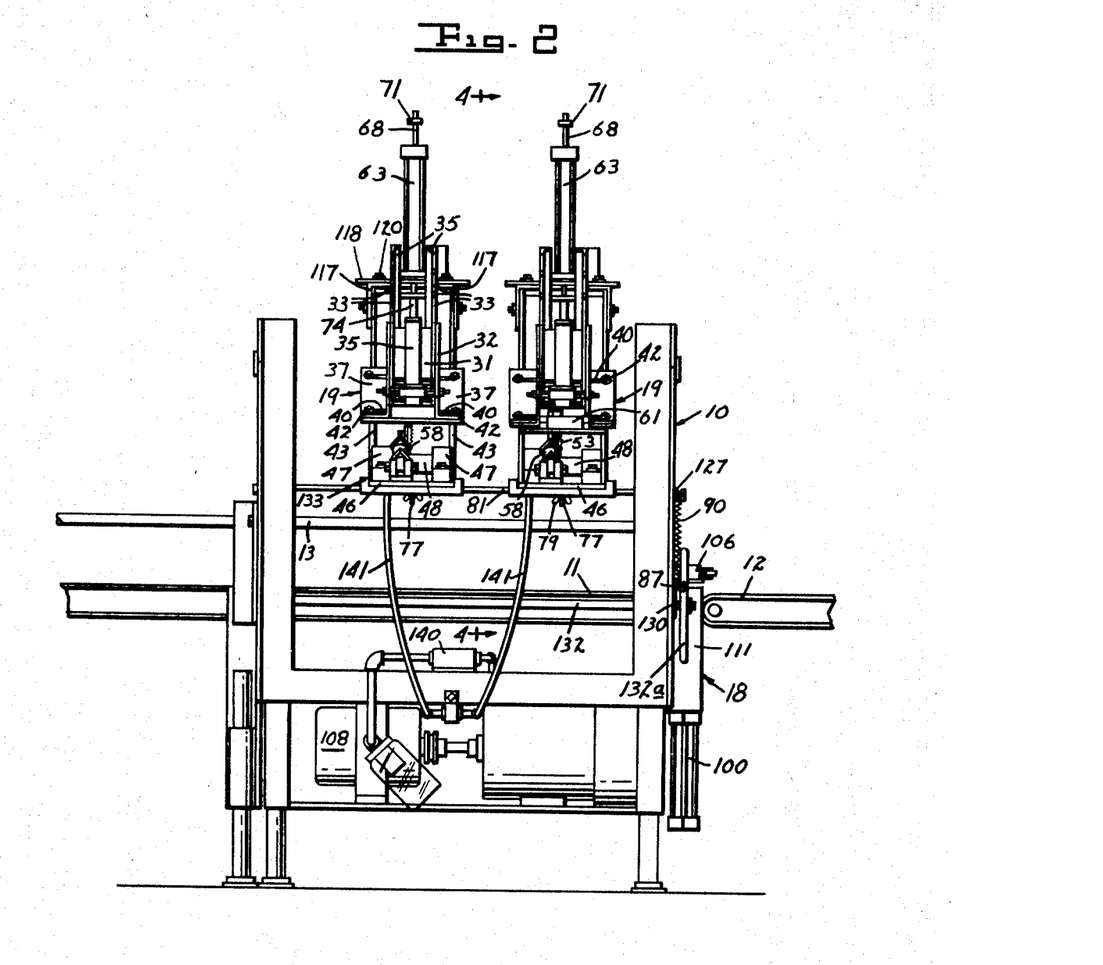
FIGURE 2 is a side elevation view of the apparatus as seen from the left in FIGURE 1.
Figure 3:
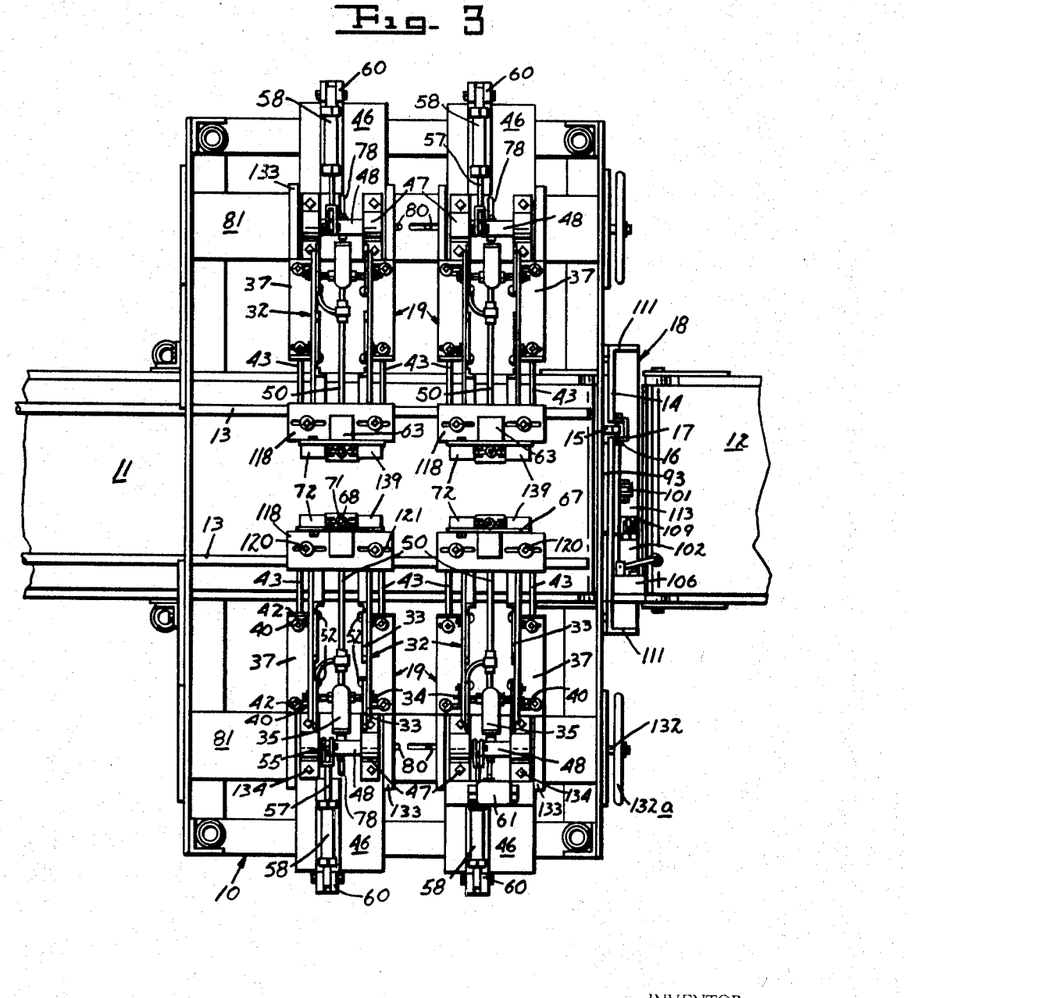
FIGURE 3 is a top view of the apparatus.

Referring now to the drawings, the general assembly can best be seen in FIGURES 1 through 3. It includes a frame generally designated as 10 carrying four tag attaching units generally designated as 19. A continuously moving conveyor 11 acts to bring cartons containing four "six packs" each to a position below the tag attaching unit 19. Guide rods 13 located directly above and on either side of conveyor 11 serve to position cartons properly below the tag attaching units 19. A second continuously moving conveyor 12 acts to carry the cartons from the apparatus after tags have been attached to selected bottles within each carton. The conveyors 11 and 12 are both driven independently of the frame 10 and tag attaching units 19.

Figures 5, 6, 7:
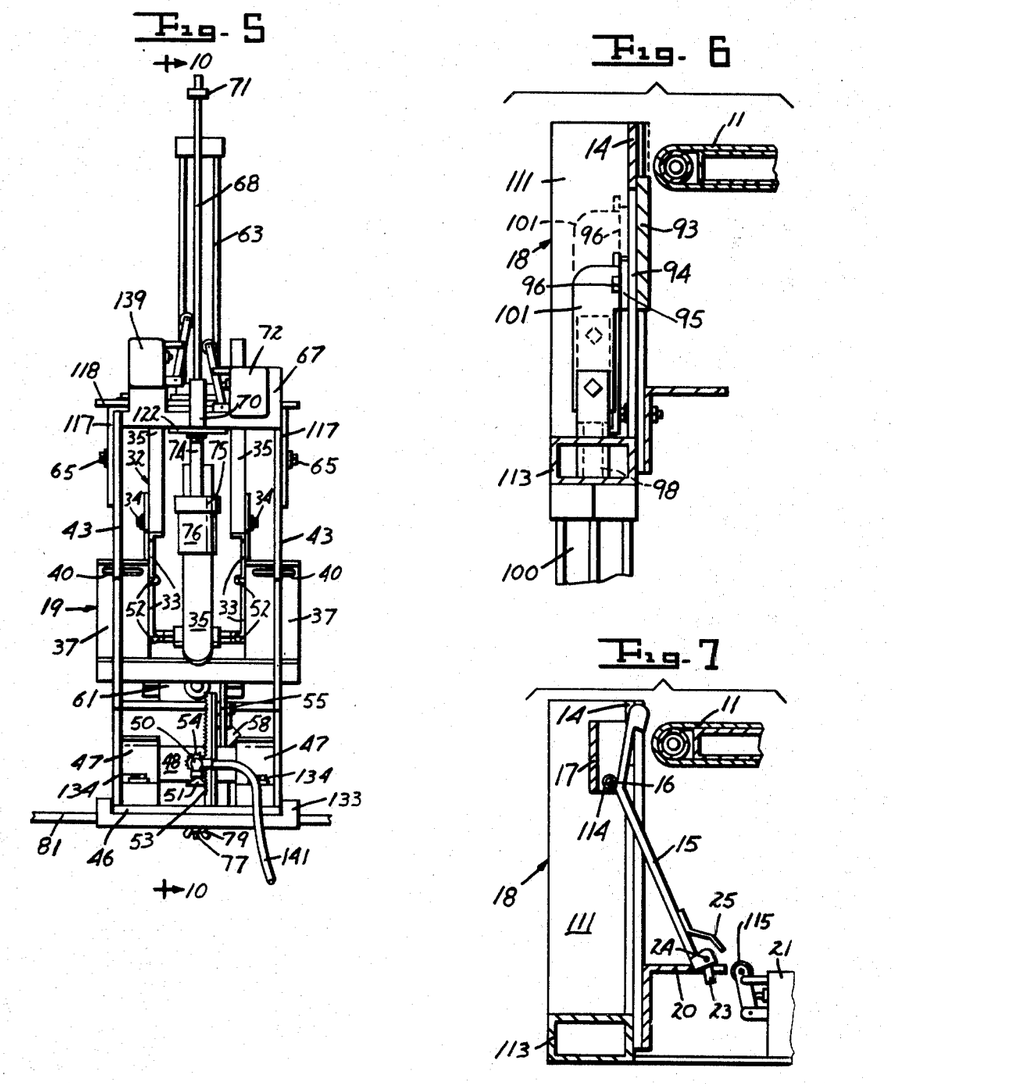
FIGURE 5 is a fragmentary elevation view of the apparatus as seen along line 5—5 in FIGURE 4.
FIGURE 6 is an enlarged fragmentary sectional view taken along line 6—6 in FIGURE 1 illustrating the raised position of the pushing plate in dashed lines.
FIGURE 7 is an enlarged fragmentary sectional view taken along line 7—7 in FIGURE 1.
Figures 8, 9, 10:
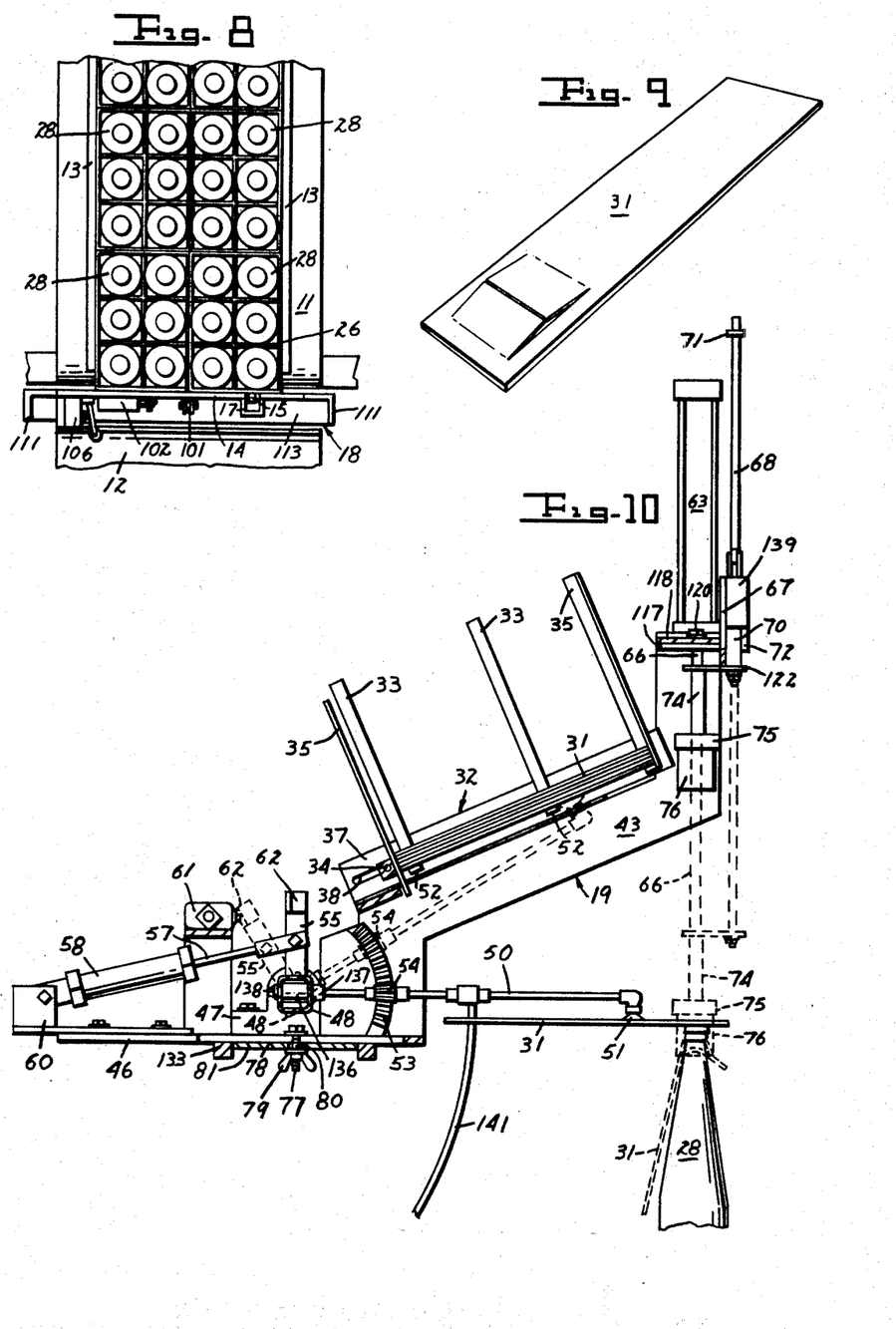
FIGURE 8 is a schematic top view illustrating the position of cartons containing "six packs," prior to the placement of tags on selected bottles.
FIGURE 9 is a perspective view of a typical tag.
FIGURE 10 is a sectional view taken along line 10—10 in FIGURE 5 illustrating in dashed lines the raised position of a suction cup carrying arm and the lowered position of the collar used to place tags on bottles.

Directly adjacent to one end of conveyor 11 is a stationary front wall 18 which serves to selectively stop the movement of cartons relative to frame 10 (FIGURE 8). The stopping of a carton for a short period of time positions the bottles in a carton, permitting each unit 19 to place a tag on one bottle within each carton. The wall 18 projects vertically a short distance above continuously moving conveyor 11 to effectively prevent movement of cartons (FIGURE 6). Wall 18 consists of a plate 14 fixed to the top ends of vertical angle irons 111 and a rectangular channel 113 fixed to the bottom ends of angle irons 111 (FIGURE 1). The angle irons 111 are slotted to receive bolts 112 which allow adjustment of the wall 18 in a vertical direction relative to conveyors 11 and 12. The various elements mounted on wall 18 will be described later.

Located on either side of conveyor 11 is a horizontal transverse plate 81. Each plate 81 supports two tag attaching units 19. Each tag attaching unit 19 has a mounting plate 46 which is adjustably fixed to plate 81. Each plate 46 carries the means by which tags are stored, delivered to and placed on bottles. First to be described is the tag storage means.

Figure 4:
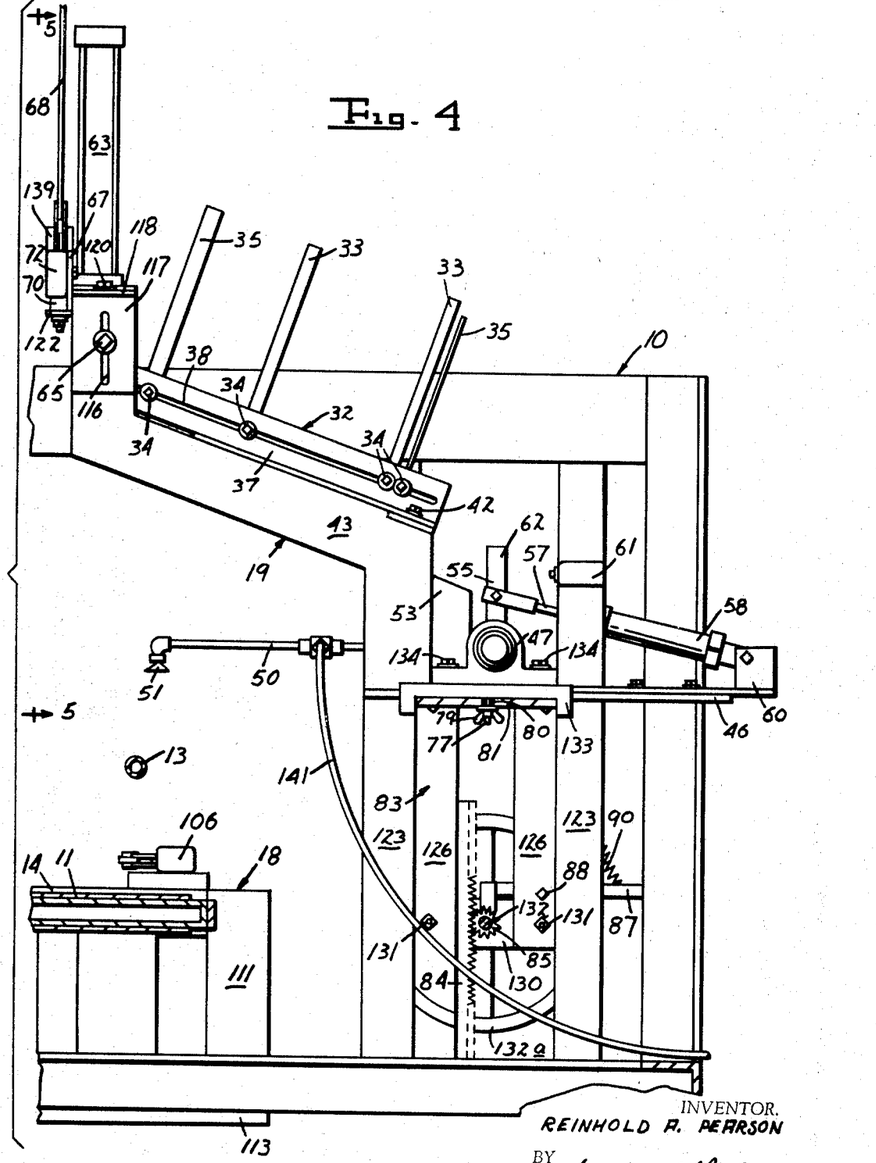
FIGURE 4 is an enlarged fragmentary sectional view of the apparatus as seen along line 4—4 in FIGURE 2.

Fixed to each plate 46 are a pair of upwardly extending vertical plates 43 (FIGURES 4 and 10). The pair of vertical plates serve to adjustably mount tag storage hoppers generally designated as 32. Each hopper 32 consists of a pair of angle irons 37 which carry side posts 33 and end posts 35. Tags 31 are retained within each hopper 32 by side posts 33, and end posts 35. They are supported by inwardly projecting tabs 52 located at the lowermost end of each side post 33 and end post 35. The posts 33, 35 are adjustably connected to the vertical sides of angle iron 37 by means of bolts 34. The bolts 34 are received by slots 38 in angle irons 37 which allow adjustment of side posts 33 and end posts 35 relative to each pair of angle irons 37. This adjustable feature enables hoppers 32 to accommodate tags of different lengths.

The hopper units 32 can also be adjusted to accommodate tags of various widths. The angle irons 37 are slotted near both ends at 40 to receive bolts 42. Bolts 42 act to connect angle irons 37 to the pair of vertical plates 43. Loosening of bolts 42 permits posts 33 and 35 carried by the respective angle irons 37 to be moved toward or away from each other to accommodate narrow or wide tags.

Mounted on each plate 46 along with the tag storage hopper 32 is the means by which tags are delivered to a selected bottle in a carton stopped on conveyor 11 by front wall 18. Each mounting plate 46 pivotally carries a suction arm 50 on which is mounted a vacuum cup 51. Arm 50 and the vacuum cup 51 act to deliver a tag 31 from storage hopper 32 to a position where the slotted end of tag 31 is aligned coaxially above a bottle in one "six pack" (FIGURE 10). Each vacuum arm 50 is rotatably mounted in a square shaft 48 pivotally supported by bearings at the outer end of the individual plate 46 of a unit 19. The bearings 47 are fixed to plate 46 by bolts 134. The shaft 48 is pivoted about its axis by means of a pneumatic cylinder 58 carried on a mounting bracket 60 fixed to a plate 46 by bolts 135. Air is supplied to cylinder 58 from a conventional source (not shown). The cylinder rod 57 is pivotally connected to crank arm 55 which is fixed to shaft 48. As cylinder 58 contacts the arm 50 carrying vacuum cup 51 is pivoted upwardly about the central axis of shaft 48. When arm 50 reaches its upper position (shown in dashed lines in FIGURE 10), a tag 31 at the bottom of hopper 32 is contacted and held by the vacuum pressure at suction cup 51 so that the suction cup 51 adheres to the exposed tag surface. When cylinder 58 expands the arm 50 pivots downwardly about the central axis of shaft 48 to a position shown in full lines in FIGURE 10. Suction cup 51 carries a tag 31 to which it has adhered to a position where the slotted end of tag 31 is at the elevation of the top of a cap on bottle 28 and the tag is substantially horizontal. Once tag 31 is in this position it can be forced onto bottle 28 by a collar 76 which will be described later.

While vacuum arm 50 is pivoted about the central axis of shaft 48 during its upward and downward movement it also rotates 180° about its own axis. This 180° rotation is caused by a pinion gear 54 fixed to arm 50 in meshing contact with an arcuate gear 53. The gear 53 is mounted on plate 46 and is fixed. The vacuum arm 50 is rotatably carried in a bearing 136 fixed to shaft 48. Collars 137 and 138 fixed to arm 50 and located on opposite sides of shaft 48 serve to rotatably fix arm 50 to shaft 48. The surface of suction cup 51 contacts the lowermost tag 31 when arm 50 is in the raised position shown in dashed lines in FIGURE 9. As the arm 50 swings downward to its lowest position shown in full lines in FIGURE 9, the arm 50, suction cup 51 and tag 31 rotate 180° and bring the tag 31 down first with suction cup 51 and arm 50 above it. The primary reason for the rotation of vacuum arm 50 about its own axis is to position the suction cup 51 and arm 50 above the tag 31 when it is level with the top of a bottle 28. The tag 31 can then be easily forced onto the bottle 28 without being bent or interfered with by arm 50 or suction cup 51.

The vacuum arms 50 of each of the four tag attaching units 19 are caused to rotate upwardly and downwardly in unison. The upward rotation of vacuum arms 50 is control valve 21 controlled by a lever 15 mounted on pneumatic cylinders 58 are activated by a pneumatic control valve 21 controlled by a level 15 mounted on the front wall 18 (FIGURE 7). When the leading side of a carton on conveyor 11 approaches front wall 18 it makes contact with the upper end of lever 15 (FIGURE 8). The lever 15 is pivotally mounted on front wall 18 to allow its lower end to swing in a direction opposite to that of the moving cartons on conveyor 11. Pivotal motion of lever 15 trips pneumatic control valve 21 and thereby activates cylinder 58 to initiate a cycle of operation.

The lever 15 is provided with a mounting sleeve 114 which receives shaft 16 fixed to a bracket 17 carried on plate 14 of front wall 18 (FIGURE 7). This arrangement allows lever 15 to pivot on the shaft 16 once the lever 15 is contacted by a carton. An angle iron 20 which is a part of frame 10 acts as a fixed stop for the lower end of lever 15. The lower end of lever 15 is provided with a tab 23 which can pivot on shaft 24. A bar 25 limits pivotal motion of tab 23 and insures the return of tab 23 to the position shown in FIGURE 7. This arrangement at the lower end of lever 15 is used to provide effective activation of pneumatic control valve 21 in response to rearward motion of the lower end of lever 15. The lower end of lever 15 acts as a counterweight to return lever 15 to the position shown in FIGURE 7 when the upper end of the lever is released from contact with a carton. When the lower end of lever 15 swings forwardly the tab 23 is allowed to pivot on shaft 24 and ride freely over roller 115 of valve 21. The air hose connections between the pneumatic control valves, pneumatic cylinders, and an air compressor are not shown in the drawings.

Downward movement of vacuum arms 50 is controlled by a pneumatic control valve 61 mounted on one of the plates 46 shown at the lower right hand corner of FIGURE 3. When activated, valve 61 initiates expansion of all four pneumatic cylinders 58 and the lowering of arms 50. Pneumatic control valve 61 also controls downward movement of collars 76 which force tags 31 onto bottles 28. The downward movement of collars 76 is regulated by a flow control valve (not shown) which slows movement of collars to assure that the vacuum arm 50 have properly positioned tags 31 above the bottles 28 prior to contact of the tags by collars 76. The pneumatic control valve 61 is activated by an extension of one crank arm 55 as shown in dashed lines in FIGURE 10.

The individual supporting apparatus for each collar 76 is carried by each pair of vertical plates 43. A vertical cylinder 63 is mounted on a vertically adjustable bracket 117 fixed to plates 43 by means of bolts 65 (FIGURES 4 and 5). The bolts 65 are received by slots 116 in bracket 117 which allow cylinder 63 to be adjusted in a vertical direction. The cylinder 63 has fixed to its bottom end a plate 18 which carries bolts 120 in slots 121.

The loosening of bolts 120 allows the plate 118 and cylinder 63 to be moved transversely relative to bracket 117.

The cylinder rod 66 of each cylinder 63 caries a rubber tube 74 at its lower end. The rubber tube 74 carries a circular plate 75 which has a rubber collar 76 fixed to it. The flexible rubber tube 74 and collar 76 permit self-alignment of the lower edge of collar 76 to accommodate slight misalignment of a bottle.

Mounted for movement with each rod 66 is an upwardly directed guide rod 68. A ring 71 attached to the upper end of each guide rod 68 serves to actuate a pneumatic control valve 139 as each guide rod 68 reaches its lower-most position. The lower end of each guide rod 68 is fixed to a horizontal connector plate 122 which is also fixed to each cylinder rod 66. Each guide rod 68 is slidably carried in a sleeve 70 fixed to each vertical plate 67.

As the bottom of collar 76 comes in contact with a tag 31 held in contact with the top of a bottle during downward motion of collar 76 the vacuum in suction cup 51 is released. The release of vacuum pressure at each cup 51 is controlled by actuation of a pneumatic control valve 139 mounted on each of the vertical plates 67 fixed to parallel plates 43 (FIGURE 5). The pneumatic valves 139 actuate pneumatically operated vacuum relief valves 140 mounted on frame 10 connected to vacuum arms 50 by hoses 141 (FIGURE 2). The pneumatically operated relief valves 140 are connected to a vacuum pump 108 mounted on frame 10.

Each pneumatic control valve 139 is positioned vertically on plate 67 so that it is actuated by downwardly moving ring 71 as the bottom surfaces of collars 76 come in contact with tags 31 held adjacent to the tops of bottles 28 by suction cups 51. The tags 31 must not be held any longer than necessary, for the tag 31 when contacted by collar 76 might kink and flop outwardly from its intended position on the neck of a selected bottle.

Following the cutting of vacuum in suction cup 51 the slotted end of tag 31 is forced onto the neck of the bottle by collar 76 as shown in dashed lines in FIGURE 10. The cylinder rod 66 is then retracted to its original position shown in full lines in FIGURE 10. This reversal of the cylinder rod is caused by activation of the individual pneumatic control valves 72 mounted on the four vertical plates 67 (FIGURE 5). The pneumatic control valves 72 are activated by rings 71 attached to the upper ends of guide rods 68.

The pneumatic control valves 72, when operated by the downward moving rings 71 on guide rods 68, actuates a pneumatic cylinder 100 mounted on front wall 18. The cylinder 100 acts to raise a pusher plate 93 to its highest point as shown in dashed lines in FIGURE 6 to lift the front end of a carton stopped by front wall 18. When the front end of the carton is above the plate 14 of wall 18, the carton can be moved forwardly over plate 14 by the continuously moving conveyor 11 and deposited on conveyor 12. The pneumatic cylinder 100 is actuated only after tags 31 have been placed on the bottles and the collars 76 have been raised above the tops of the bottles.

Plate 93 is guided on fixed upright guide plates 94 by a plate 95 which is connected to plate 93 by bolts 96. The guide plates 94 serve as bearing surfaces on which the plate 95 and pusher plate 93 can slide. A bracket 101 connects plate 95 and the upper end of cylinder rod 98 of cylinder 100.

Mounted directly adjacent to one of guide plates 94 is a pneumatic control valve 102. The pneumatic control valve 102 is activated when pusher plate 93 reaches its highest point and causes the reversal of cylinder 100 and the lowering of pusher plate 93. The pneumatic control valve 102 is actuated by finger 109 which is fixed to and extends outwardly from plate 95 (FIGURE 1).

After a carton of "six packs" has passed over plate 14 it will contact a pneumatic control valve 106 that resets the vacuum relief valve 140 to re-establish vacuum at cups 51. With vacuum again established at suction cups 51 the tag attaching units 19 are ready to place tags on bottles carried in the next carton to be stopped by wall 18.

A necessary feature of the tag attaching apparatus is its adaptability for a variety of bottle and carton sizes. The basic tag attaching units 19 are adapted for movement in three directions relative to conveyor 11 and the cartons of bottles carried thereon. Lateral movement of each tag attaching unit 19 relative to conveyor 11 is made possible by a bolt 77 received in slot 78 in mounting plate 46 (FIGURE 10). The bolt 77 is also received by a slot 80 in transverse plate 81. The plates 46 and 81 can be securely connected to each other by the tightening of wing nut 79 on bolt 77. When wing nut 79 is loosened each tag attaching unit 19 can move toward or away from the center of conveyor 11. Plate 46 is maintained in proper alignment relative to plate 81 by a rectangular frame 133 which slidably engages the front and rear edges of plate 81 and the side edges of plate 46.

Each tag attaching unit 19 can also be moved transversely along the plates 81. This adjustable feature is again necessary to adapt the apparatus to various size bottles and cartons and to permit placement of tags on any desired bottles. The transverse movement of each tag attaching unit 19 is accomplished by the loosening of wing nut 79 on bolt 77. The plate 46 can then slide along the top of plate 81 with the bolt 77 travelling in slot 80.

When each tag attaching unit 19 is properly positioned on transverse plate 81 on the wing nuts 79 it can be tightened on bolt 77 thus firmly positioning plate 46 relative to transverse plate 81.

Vertical movement of tag attaching unit 19 is necessary to adapt the apparatus to bottles of various heights. Vertical movement of tag attaching units 19 is accomplished by rack and pinion combination on movable frames 83. There is one movable frame 83 located on either side of conveyor 11. Each frame 83 carries one transverse plate 81 on which are mounted two tag attaching units 19 (FIGURES 1, 3 and 4). The operation and structure of each movable frame 83 is exactly the same so only one frame 83 will be described in detail.

The movable frame 83 is carried in guide posts 123 to frame 10 and located on either side of the movable frame 83. Sliding on both front and rear guide posts 123 are support posts 126. The tops of support post 126 are fixed to the transverse plate 81 and a limit plate 127. The plates 127 at both the front and rear end of the apparatus serve to limit the vertical movement of each frame 83.

The bottom ends of support posts 126 are connected by a plate 130 fixed to each support post by bolts 131. The plate 130 carries a pinion gear 85 fixed to an axle 132. The pinion gear 85 is in meshing contact with rack 84 fixed to frame 10. When axle 132 is turned by a hand wheel 132a fixed to it, the pinion gear 85 turns on rack 84 and frame 83 is either lifted or lowered. When the frame 83 is to be stopped at a certain height the gear 85 is locked by a locking bar 87 pivotally mounted on a support post 126. The locking bar 87 is forced against pinion gear 85 by a spring 90. When rotation of the pinion gear is to be allowed the locking bar 87 can be rotated about the pivot 88, breaking contact with pinion 85.

The operation of the tag attaching apparatus can best be understood from a study of FIGURES 3, 6, 7, 8, 9 and 10. The operation of the apparatus begins when a carton moving with the continuously moving conveyer 11 makes contact with lever 15 on the stationary front wall 18. The lever 15 is caused to pivot on shaft 16 when contacted by carton 26 (FIG. 7). As the lever 15 pivots it trips a pneumatic control valve 21 which causes the four pneumatic cylinders 58 to contract. The contraction of cylinders 58 causes movement of crank arms 55 fixed to shafts 48 (FIG. 10). The resulting pivotal movement of shafts 48 raises the vacuum arms 50 which are rotatably joined to the respective shafts 48. When vacuum arms 50 reach their highest position, the suction cups 51 carried on arms 50 face upwardly and grip the bottom tag 31 carried in each hopper 32. As the vacuum arms 50 rotate upwardly, they also rotate 180° about their central axes due to the meshing engagement of gears 53, 54. Pivotal movement of arms 50 about the axes of shafts 48 is reversed by contact of pneumatic control valve 61 by the crank arm 62. As the vacuum arms rotate downward they also rotate 180° about their respective axes. When each arm 50 reaches its lowest point as seen in full lines in FIGURE 10, the tag 31 held by it is in a horizontal position and held by the downwardly facing cup 51 gripping it and is in position to be placed on bottle 28.

Actuation of pneumatic cylinder 63 which controls valve 61 also causes the downward movement of collars 76. The pneumatic cylinders 63 which control the movement of collars 76 are regulated by a suitable flow valve to prevent the arrival of collars 76 over the bottle 28 before the tags 31 have been properly positioned. As the bottom edges of the downwardly moving collars 76 become level with the tops of bottle 28, the vacuum pressure to suction cup 51 is cut by pneumatic control valve 139 which activates vacuum relief valve 140. The tags 31 are then forced about the bottles 28 by the downward movement of the collars 76. Continued movement of collars 76 results in actuation of pneumatic control valves 72 by rings 71 fixed to guide rods 68. This causes the reversal of cylinders 63 and upward movement of collars 76. Actuation of pneumatic control valves 72 also causes pneumatic cylinder 100 to raise pusher plate 93. After tags 31 have been placed on bottles 28 and the collars 76 have been raised above the tops of bottles 28, the pusher plate 93 contacts the bottom of a carton stopped by front wall 18 and raises the front of each carton above the front wall 18.

Following the raising of the front of each carton stopped by wall 18, the continuously moving conveyor 11 acts to move the carton onto conveyor 12. The pusher plate 93 is lowered after it reaches its highest point by actuation of pneumatic control valve 102. As each carton passes over front wall 18, pneumatic control valve 106 is contacted. The pneumatic control valve 106 actuates vacuum relief valve 140 and causes a vacuum to be established on cups 51.

Various modifications could be made in the design of this apparatus while maintaining the basic concept of the construction. For this reason, the structure described above is not intended to limit or restrict the scope of the invention, which is defined in the claims which follow.

Having thus described my invention, I claim:

1. An apparatus for attaching a tag about the neck of a bottle wherein the tag is in the form of a sheet having a portion thereof apertured to receive the bottle, the apparatus comprising:
    a supporting framework;
    indexing means on said framework for positioning an upright bottle relative to the framework;
    tag storage means on said framework, including an upright hopper having the lower surface of the lowermost tag therein being exposed;
    tag delivery means on said framework, including a suction cup movably mounted on the framework for motion between a first position facing toward the exposed lower surface of the lowermost tag in the hopper wherein the suction cup adheres thereto and a second position facing downwardly wherein the suction cup positions the tag to which it has adhered in a horizontal position upwardly adjacent to the bottle and with the apertured portion of the tag centered thereon;
    and tag placement means on said framework for urging the tag downwardly about the bottle neck.

2. The apparatus as set out in claim 1 wherein the tag placement means comprises:
    a tubular member on the framework moving between a first position clear of the bottle and a second upright position overlapping and encircling the bottle neck, whereby a tag placed over the bottle will be urged downwardly over the bottle by such movement;
    said tubular member being movably mounted on the framework for straight line motion coaxially along the center upright bottle axis, the interior diameter of the tubular member being greater than the exterior diameter of the portion of the bottle neck encircled thereby.

3. The apparatus as set out in claim 2 wherein the tubular member is supported by a resilient mount permitting the tubular member to deviate from its normal straight line motion in order to receive a bottle neck.

4. The apparatus as set out in claim 2 further comprising:
    power means on said framework operatively connected to the tubular member for selectively moving the tubular member between its first and second positions;
    and control means on said framework for causing said power means to move the tubular member from its first position to its second position following movement of the suction cup to its second position.

5. In an apparatus for attaching a tag about the neck of a bottle wherein the tag is in the form of a sheet having a portion thereof apertured to receive the bottle, the improvement comprising:
    a tag storage hopper mounted to a supporting framework at an elevation above the bottle;
    a rigid arm pivotally connected to the framework and being provided with a suction cup at the outer end thereof;
    first power means on said framework operatively connected to the arm for selectively pivoting the arm between a first position wherein the suction cup can adhere to a tag within the tag storage hopper and a second position wherein a tag so adhered is located upwardly adjacent to a bottle;
    intermeshing means on said arm and the framework for pivoting the suction cup about the longitudinal axis of the arm in response to operation of the first power means in order that the suction cup faces downwardly in its second position;
    a tubular member on the framework movable between a first position clear of the bottle and a second upright position overlapping and encircling the bottle neck, whereby a tag placed over the bottle will be urged downwardly over the bottle by such movement;
    said tubular member being movably mounted on the framework for straight line motion coaxially along the center upright bottle axis, the interior diameter of the tubular member being greater than the exterior diameter of the portion of the bottle neck encircled thereby.

6. The apparatus as set out in claim 5 wherein the tubular member is supported by a resilient mount permitting the tubular member to deviate from its normal straight line motion in order to receive a bottle neck.

7. The apparatus as set out in claim 5 further comprising:
    second power means on the framework operatively connected to the tubular member for selectively moving the tubular member between its first and second positions;
    and control means on the framework for causing the second power means to move the tubular member from its first position to its second position following movement of the suction cup to its second position.

8. An apparatus as set out in claim 1 wherein said tag delivery means further comprises:
a rigid arm having the suction cup mounted thereto at one end of the arm, the remaining end of the arm being pivotally carried on the framework about a horizontal axis thereon;
and power means on the framework operatively connected to said arm for moving the suction cup between its first and second positions.

9. An apparatus as set out in claim 8 further comprising:
intermeshing means on said arm and framework for pivoting the suction cup about the longitudinal axis of the arm in response to operation of said power means.

References Cited

UNITED STATES PATENTS

| 2,852,899 | 9/1958 | Murrell | 29—208 |
| 3,212,174 | 10/1965 | Wonneman | 29—208 |
| 3,267,566 | 8/1966 | Ouellette | 29—208 |
| 3,360,843 | 1/1968 | Pearson | 29—208 |

THOMAS H. EAGER, *Primary Examiner.*